US008351343B1

(12) United States Patent
Schmalz et al.

(10) Patent No.: US 8,351,343 B1
(45) Date of Patent: Jan. 8, 2013

(54) EFFICIENT CHANGE RECOGNITION ALGORITHM

(75) Inventors: Joachim Schmalz, Bischweier (DE); Manfred Kunz, Rastatt (DE)

(73) Assignee: Marvell International Ltd. (BM)

( * ) Notice: Subject to any disclaimer, the term of this patent is extended or adjusted under 35 U.S.C. 154(b) by 1342 days.

(21) Appl. No.: 12/044,652

(22) Filed: Mar. 7, 2008

Related U.S. Application Data

(60) Provisional application No. 60/893,476, filed on Mar. 7, 2007.

(51) Int. Cl.
*G01R 31/08* (2006.01)
(52) U.S. Cl. ............................ 370/252; 370/254
(58) Field of Classification Search .................. None
See application file for complete search history.

(56) References Cited

U.S. PATENT DOCUMENTS

| 5,155,689 | A  | * | 10/1992 | Wortham ........................ 455/456.3 |
| 6,374,266 | B1 | * | 4/2002  | Shnelvar ............................ 1/1 |
| 7,571,299 | B2 | * | 8/2009  | Loeb ............................. 711/216 |
| 7,680,946 | B2 | * | 3/2010  | Yamada et al. ................ 709/231 |

OTHER PUBLICATIONS

Bluetooth® "Specification of the Bluetooth System"; Specification vol. 0; Master Table of Contents & Compliance Requirements; Nov. 4, 2004; 74 pgs.
Bluetooth® "Specification of the Bluetooth System"; Specification vol. 1; Architecture & Terminology Overview; Nov. 4, 2004; 92 pgs.
Bluetooth® "Specification of the Bluetooth System"; Specification vol. 2; Core System Package [Controller volume]; Nov. 4, 2004; 814 pgs.
Bluetooth® "Specification of the Bluetooth System"; Specification vol. 4; Core System Package [Host volume]; Nov. 4, 2004; 250 pgs.
IEEE P802.11g/D8.2, Apr. 2003 (Supplement to ANSI/IEEE Std 802.11 1999(Reaff 2003)); IEEE P802.11g/D8.2 Draft Supplement to Standard [for] Information Technology—Telecommunications and information exchange between systems—Local and metropolitan area networks—Specific requirements—Part 11: Wireless LAN Medium Access Control (MAC) and Physical Layer (PHY) specifications: Further Higher Data Rate Extension in the 2.4 GHz Band; 2003 IEEE; 69 pgs.
IEEE Std 802.11g/D2.8, May 2002 (Supplement to ANSI/IEEE Std 802.11, 1999 Edition), Draft Supplement to Standard [for] Information Technology—Telecommunications and information exchange between systems—Local and metropolitan area networks—Specific requirements—Part 11: Wireless LAN Medium Access Control (MAC) and Physical Layer (PHY) specifications: Further Higher-Speed Physical Layer Extension in the 2.4 GHz Band Copyright 2001-2002 by the Institute of Electrical and Electronics Engineers, Inc.; 50 pgs.
802.11h™; "IEEE Standard for Information technology—Telecommunications and information exchange between systems—Local and metropolitan area networks—Specific requirements Part 11: Wireless LAN Medium Access Control (MAC) and Physical Layer (PHY) specifications; Amendment 5: Spectrum and Transmit Power Management Extensions in the 5 GHz band in Europe"; IEEE Computer Society; Oct. 14, 2003; 75 pgs.

(Continued)

*Primary Examiner* — Robert Wilson
(74) *Attorney, Agent, or Firm* — Brinks Hofer Gilson & Lione

(57) ABSTRACT

A data recognition system for a wireless device that includes a storage module that stores a first hash value and a processing module that generates a second hash value based on an incoming data stream received by the wireless device and detects a change in the incoming data stream based on a comparison between the first hash value with the second hash value.

20 Claims, 8 Drawing Sheets

OTHER PUBLICATIONS

Syed Aon Mujtaba, Agere Systems; "IEEE P802.11 Wireless LANs"; doc.: IEEE802.11-04/0889r6; May 2005; 131 pgs.

802.16™; "IEEE Standard for Local and metropolitan area networks Part 16: Air Interface for Fixed Broadband Wireless Access Systems"; IEEE Computer Society and the IEEE Microwave Theory and Techniques Society; Apr. 8, 2002; 349 pgs.

802.16™; "IEEE Standard for Local and metropolitan area networks Part 16: Air Interface for Fixed Broadband Wireless Access Systems—Amendment 2: Medium Access Control Modifications and Additional Physical Layer Specifications for 2-11GHz"; IEEE Computer Society and the IEEE Microwave Theory and Techniques Society; Oct. 1, 2004; 892 pgs.

802.16a™; "IEEE Standard for Local and metropolitan area networks Part 16: Air Interface for Fixed Broadband Wireless Access Systems"; IEEE Computer Society and the IEEE Microwave Theory and Techniques Society; Apr. 1, 2003; 316 pgs.

802.16e™ "IEEE Standard for Local and metropolitan area networks Part 16: Air Interface for Fixed and Mobile Broadband Wireless Access Systems Amendment 2: Physical and Medium Access Control Layers for Combined Fixed and Mobile Operation in Licensed Bands and Corrigendum 1"; IEEE Computer Society and the IEEE Microwave Theory and Techniques Society; Feb. 28, 2006; 859 pgs.

802.11a-1999 "Supplement to IEEE Standard for Information technology—Telecommunications and information exchange between systems—Local and metropolitan area networks—Specific requirements—Part 11: Wireless LAN Medium Access Control (MAC) and Physical Layer (PHY) specifications: High-speed Physical Layer in the 5 GHz Band"; The Institute of Electrical and Electronics Engineers, Inc.; Dec. 30, 1999; 91 pgs.

802.11b-1999 "Supplement to IEEE Standard for Information technology—Telecommunications and information exchange between systems—Local and metropolitan area networks—Specific requirements—Part 11: Wireless LAN Medium Access Control (MAC) and Physical Layer (PHY) specifications: Higher-speed Physical Layer Extension in the 2.4 GHz Band"; The Institute of Electrical and Electronics Engineers, Inc.; Jan. 20, 2000; 96 pgs.

"Draft 802.20 Permanent Document <System Requiremer EEE 802.20 Mobile Broadband Wireless Systems—Version 14>"; IEEE P 802.20™ V14; Jul. 16, 2004; 23 pgs.

8802-11 1999 "Information Technology—Telecommunications and Information Exchange Between Systems—Local and Metropolitan Area Networks—Specific Requirements—Part 11: Wireless LAN Medium Access Control (MAC) and Physical Layer (PHY) Specifications", International Standard; ISO/IEC; 531 pgs.

* cited by examiner

| ID | B15 | B14 | B13 | B12 | B11 | B10 | B9 | B8 | B7 | B6 | B5 | B4 | B3 | B2 | B1 | B0 |
|---|---|---|---|---|---|---|---|---|---|---|---|---|---|---|---|---|
| Octet Stream | 2 | DF | 34 | 7F | 23 | 10 | 1A | DE | 3A | 7C | 23 | 10 | 50 | EF | BA | 02 | FF |
| Mask | 2 | 0 | 1 | 1 | 0 | 0 | 1 | 1 | 0 | 0 | 1 | 1 | 0 | 0 | 0 | 0 | 1 |
| Recognition Data Stream | 2 | * | 34 | 7F | * | * | 1A | DE | * | * | 23 | 10 | * | * | * | * | FF |

FIG. 3

EFFICIENT CHANGE RECOGNITION ALGORITHM

RELATED APPLICATION

This application claims the benefit of U.S. Provisional Application No. 60/893,476, filed on Mar. 7, 2007, which is incorporated herein by reference.

BACKGROUND

1. Technical Field

The present disclosure relates generally to wireless devices and, more particularly, to efficient processing of incoming data streams.

2. Related Art

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Communication systems generally can support wireless and/or wired communications between communication devices (e.g., wireless or wired communication devices) operating within a respective system. Typically, a wireless network such as a wireless local area network (WLAN) includes an access point to communicate with at least one client station such as a wireless communication device (e.g., a desktop computer, a personal digital assistant (PDA), a mobile phone, a laptop, a personal computer (PC), a printer, a digital camera, or Internet protocol (IP) phone, etc.). The access point periodically broadcasts messages (e.g., "beacons") comprising information describing the access point including recognition data such as a service set identifier (SSID). Generally, beacons are formatted and transmitted as broadcast packets. The SSID represents a code that identifies a broadcast packet as being within the network (i.e., a message transmitted between points within a given network). The client station identifies broadcast packets intended for its use based on the SSID and typically disregards broadcast packets lacking the correct SSID.

Furthermore, client stations utilize recognition data to identify, select, and/or otherwise recognize various access points operating within a given wireless network. Each wireless network device (i.e., access point or client station) within the wireless network shares the same SSID. Additionally, client stations may search for access stations within the wireless network by broadcasting probe frames to the various access points and in response receive probe responses that include recognition data transmitted from the access points.

Typically, a client station processes an entire beacon or probe response in order to identify and/or select an access point for communication. The client station compares the incoming frame to a frame stored in memory. The stored frame often requires a signification amount of memory for storage. Additionally, a processing unit of the client station is required to process the entire incoming stream. As a result, performance of the client station fails to reach optimal levels.

BRIEF SUMMARY

The present invention is defined by the following claims, and nothing in this section should be taken as a limitation on those claims.

By way of introduction, the preferred embodiments below provide a data recognition system for a wireless device that includes a storage module that stores a first hash value and a processing module that generates a second hash value based on an incoming data stream received by the wireless device and detects a change in the incoming data stream based on a comparison between the first and the second hash value.

In other embodiments, the data recognition system for a wireless device includes storage means for storing a first hash value and processing means for generating a second hash value based on an incoming data stream received by the wireless device and for detecting a change in the incoming data stream based on a comparison of the first hash value with the second hash value.

In other features, the processing means identifies an identification parameter (ID) of the incoming data stream and retrieves one of a plurality of sets of mask values based on the ID. The processing means generates a recognition data stream when the processing means masks the incoming data stream with the one of the plurality of sets of mask values. The processing means generates the second hash value based on the recognition data stream and retrieves the first hash value from the storage module based on the ID.

In other features, the processing means discards the incoming data stream when the first hash value and the second hash value are equal. The processing means sets the first hash value equal to the second hash value when the first hash value does not equal the second hash value and retains the incoming data stream for further processing by the wireless device.

Other systems, methods, and features of the invention will be, or will become, apparent to one with skill in the art upon examination of the following figures and detailed description. It is intended that all such additional systems, methods, features and advantages be included within this description, be within the scope of the invention, and be protected by the following claims.

The preferred embodiments will now be described with reference to the attached drawings.

BRIEF DESCRIPTION OF THE DRAWINGS

FIG. 3 illustrates an exemplary operation of a recognition system according to the present disclosure;

FIG. 5($b$) is a functional block diagram of a digital versatile disk (DVD);

FIG. 5($c$) is a functional block diagram of a high definition television;

FIG. 5($d$) is a functional block diagram of a vehicle control system;

FIG. 5($e$) is a functional block diagram of a cellular phone;

FIG. 5($f$) is a functional block diagram of a set top box;

FIG. 5($g$) is a functional block diagram of a media player; and

FIG. 5($h$) is a functional block diagram of a VoIP phone.

DETAILED DESCRIPTION OF THE PRESENTLY PREFERRED EMBODIMENTS

The disclosure can be better understood with reference to the following drawings and description. The components in the figures are not necessarily to scale, emphasis instead being placed upon illustrating the principles of the invention. Moreover, in the figures, like referenced numerals designate corresponding parts or elements throughout the different views. The following description is merely exemplary in nature and is in no way intended to limit the disclosure, its application, or uses. As used herein, the term module refers to an Application Specific Integrated Circuit (ASIC), an electronic circuit, a processor (shared, dedicated, or group) and memory that execute one or more software or firmware programs, a combinational logic circuit, and/or other suitable components that provide the described functionality. As used herein, the phrase at least one of A, B, and C should be construed to mean a logical (A or B or C), using a non-exclusive logical or. It should be understood that steps within a method may be executed in different order without altering the principles of the present disclosure.

By way of introduction, the embodiments described herein are related to wireless network devices such as access points and client stations that employ data recognition operations and are merely exemplary in nature. More particularly, a wireless network device includes a transceiver circuit (e.g. a RF transceiver) and/or a system-on-chip circuit (SOC) that perform(s) data recognition operations on incoming data streams to identify and/or select wireless network devices operating within a common wireless network. The present disclosure describes a recognition system that minimizes memory and processing requirements during a data recognition operation, thereby increasing the performance and efficiency of the wireless network device.

Figure 1:
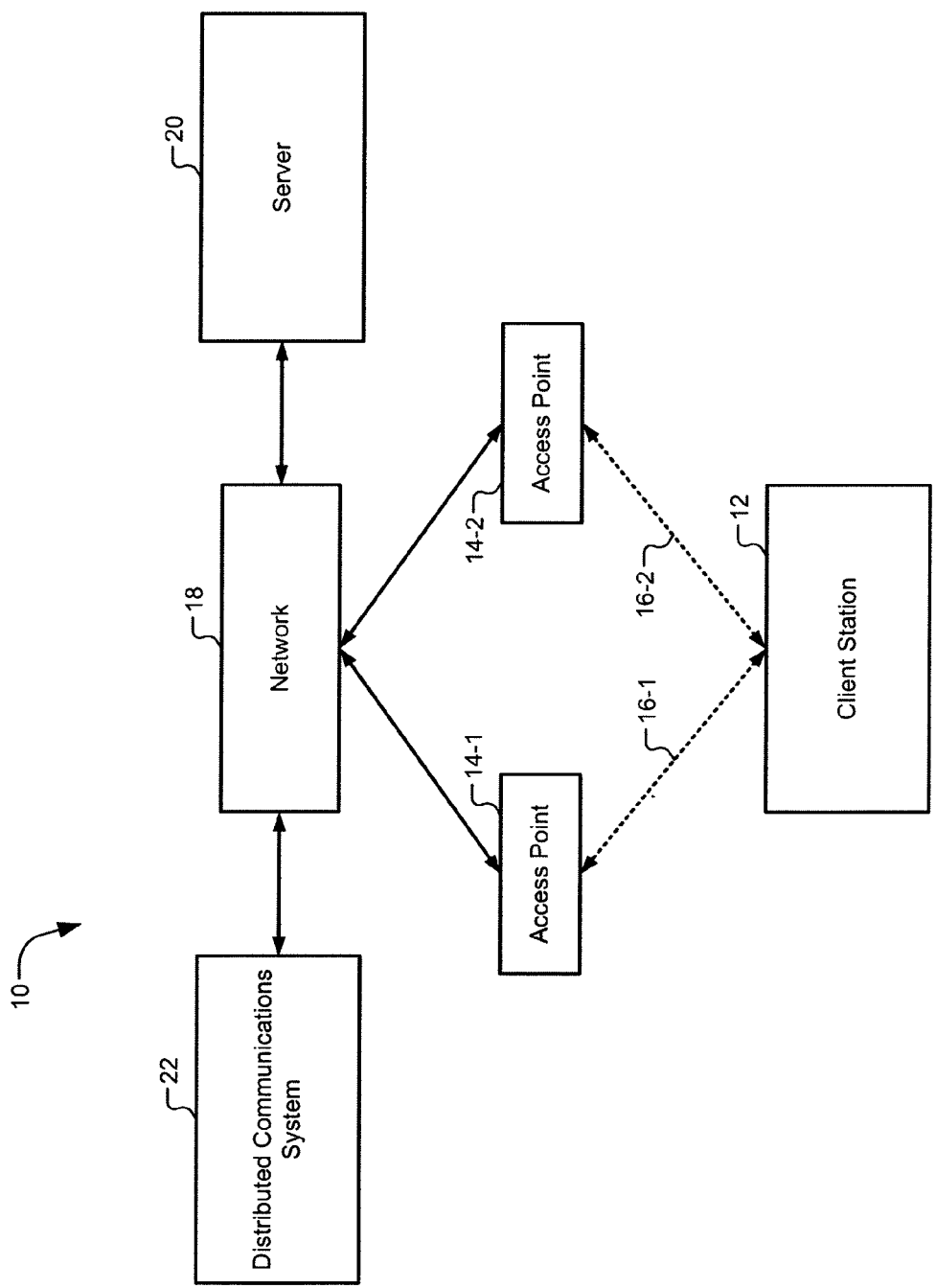
FIG. 1 is a functional block diagram of an exemplary wireless network according to the present disclosure.

Referring now to FIG. 1, an exemplary wireless network 10 is shown. Wireless communications of the wireless network 10 can be compliant with various protocols including at least one of the Institute of Electrical and Electronics Engineers (IEEE) standards 802.11, 802.11a, 802.11b, 802.11g, 802.11h, 802.11n, 802.16, 802.16a, 802.16e, 802.16-2004, and 802.20, and/or the Bluetooth standard published by the Bluetooth Special Interest Group (SIG). The aforementioned standards are hereby incorporated by reference in their entirety.

The wireless network 10 includes at least one client station 12 and access points 14-1 and 14-2, referred to collectively as access points 14. Although two access points 14 are depicted, it is appreciated that the wireless network 10 may include additional access points 14. The access points 14 communicate with the client station 12 to form the wireless network 10. Typically, the access points 14 connect to a network 18 (e.g., a wired network) and can relay data between the client station 12 and various wired devices (not shown) of the network 18. In the present implementation, the client station 12 and/or the access points 14 implement the recognition system of the present disclosure. For the sake of simplicity and brevity, the present disclosure will discuss the operation of the data recognition system with reference to the client station 12 though those skilled in the art will appreciate that the each of the access points 14 may implement the recognition system in similar fashion. The client station 12 may include, but is not limited to, a desktop computer, a personal digital assistant (PDA), a mobile phone, a laptop, a personal computer (PC), a printer, a digital camera, an internet protocol (IP) phone.

In the present embodiment, the client station 12 communicates with the access points 14-1 and 14-2 via wireless signals 16-1 and 16-2, respectively, thus enabling communication within the wireless network 10. The wireless signals 16-1 and 16-2 may include, but are not limited to, data streams that include recognition data used by the client station 12 to identify, select, and/or recognize the access points 14. Preferably, the data streams are transmitted via a broadcast packet stream although the present disclosure anticipates data being transmitted via various other types of communication links such as multipoint links. Each of the access points 14 represent a node in the network 18 and may include devices such as a network analyzer that can detect and log data transmitted over a digital network or part of a network. The network 18 may be a local area network (LAN), a wide area network (WAN), or another network configuration. The network 18 may include other nodes such as a server 20 and may be connected to a distributed communications system 22 such as the Internet.

Figure 2:
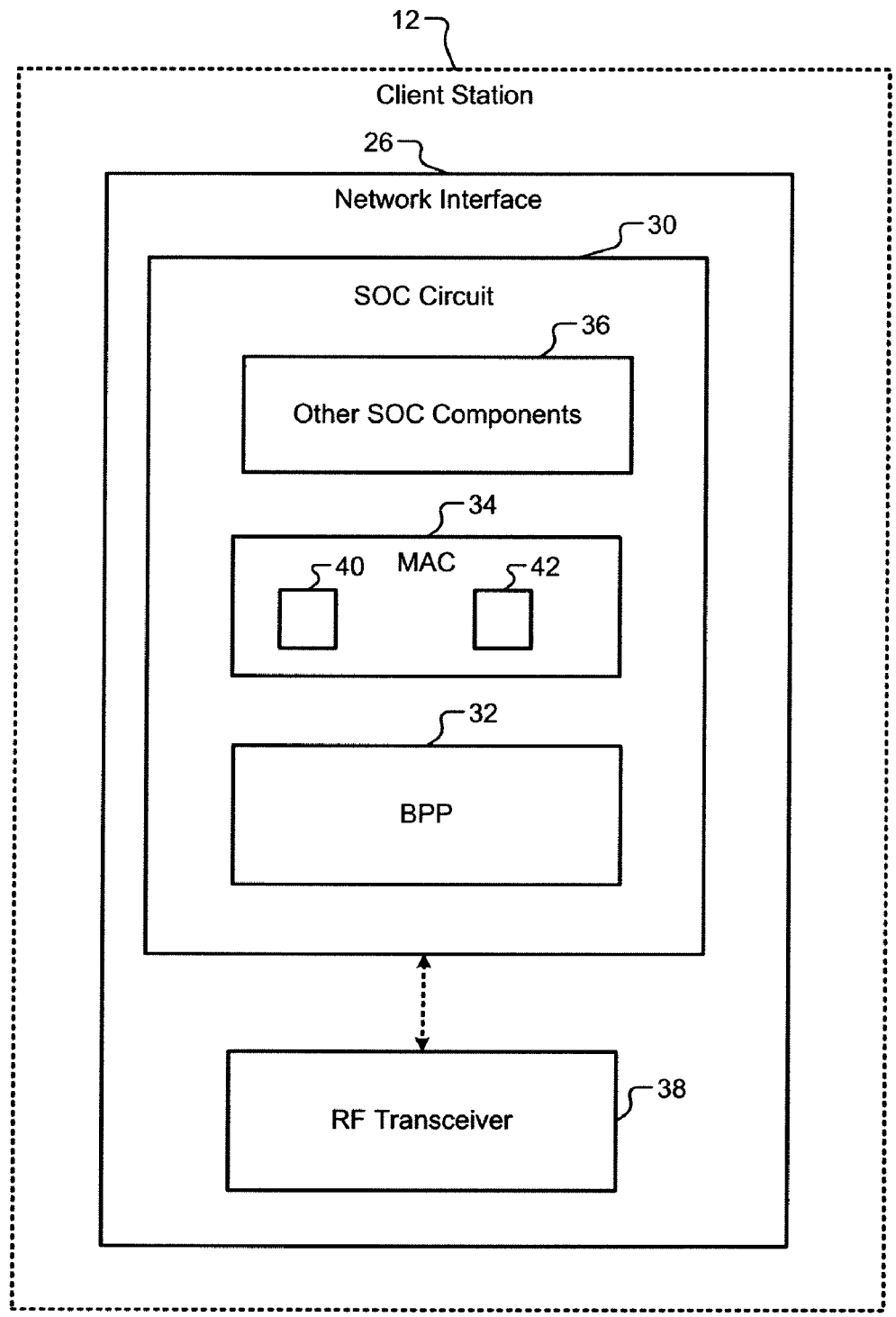
FIG. 2 is a functional block diagram of an exemplary client station including a network interface and host device according to the present disclosure.

Referring now to FIG. 2, the client station 12 is shown in more detail. The client station 12 implements the recognition system and is shown to include a network interface 26. A SOC circuit 30 of the network interface 26 includes a baseband processor (BBP) 32, a media access control (MAC) device 34, and other SOC components, identified collectively at 36, such as interfaces, firmware, memory, and/or other processors. A radio frequency (RF) transceiver 38 along with the BBP 32 communicates with the MAC device 34. BBP 32 processes signals received from and/or transmitted to the RF transceiver 38. The RF transceiver 38 modulates signals received from the BBP 32 and demodulates signals prior to transmitting the signals to the BBP 32. Additionally the RF transceiver 38 transmits/receives data (i.e. an incoming data stream or an "octet steam") to/from various access points 14 in the exemplary wireless network 10. The access points 14 may transmit incoming data streams having various types of data structures.

In the present implementation, the MAC device 34 is configured to execute MAC layer operations such as supervising and maintaining communications between the client station 12 and the access points 14. More specifically, the MAC layer may perform operations including, but not limited, to scanning the wireless network 10 for various wireless network devices, authenticating the various wireless network devices, and associating the client station 12 with the one of the access points 14. For example, the MAC device 34 (i.e., the client station 12) may determine whether to "connect" to one of the access points 14 based on data (e.g., recognition data) received in a "beacon" or probe response transmitted from one of the access points 14. In various embodiments, the MAC device 34 may additionally consider the signal strength for the received beacon or probe response when selecting one of the access points 14.

The MAC device 34 may include, but is not limited to, a processing module 40 and a storage module 42. In the present implementation, the processing module 40 performs data recognition operations in accordance with the present disclosure in order to efficiently detect changes or variances within recognition data of an incoming data stream. As mentioned previously, recognition data represents a subset of data of the incoming data stream received by the client station 12 (i.e., processing module 40). A change in recognition data may, for example, indicate that the client station 12 has received a stronger beacon or probe response from a different access point 14 as compared to a beacon or probe response of the access point 14 previously associated with the client station 12. In other words, the client station 12 may elect to switch its association among the access points 14 within the wireless network 10 based on a detected change in recognition data. Those skilled in the art will appreciate that changes in recognition data may be indicative of various other events.

The processing module 40 selectively communicates with the storage module 42, the BBP 32, the other SOC components 36, as well as the RF transceiver 38. The processing module 40 stores a plurality of sets of mask values. Each set of mask values respectively corresponds to a type of data structure characterizing an incoming data stream received by the client station 12. The processing module 40 stores and retrieves a set of mask values based on an identification parameter (ID) associated with each type of potential data structure of an incoming data stream. The mask values mask, or filter, data of the incoming data stream not to be operated upon by the processing module 40 during a data recognition operation. In other words, upon masking the incoming data stream, the remaining data stream (i.e. the recognition data stream) includes recognition data associated with a particular access point 14.

The storage module 42 serves as a data storage component for the processing module 40. The storage module 42 stores hash values generated by the processing module 40 during previous data recognition operations (i.e., hash values generated at previous points in time). In the present implementation, the storage module 42 retains a hash value for each type of data structure previously processed by the processing module 40 for use during subsequent data recognition operations. In the present implementation, the storage module 42 is indexed by the IDs associated with the various types of data structures. The processing of incoming data streams to the client station 12 will be discussed in further detail below.

Referring now to FIGS. 2 and 3, an exemplary data recognition operation is discussed in more detail. Those skilled in the art will appreciate that client station 12 may execute several iterations of the data recognition operation prior to establishing a connection to one of the access points 14. Additionally, the present disclosure contemplates performing data recognition operations periodically (e.g., every 100 milliseconds). FIG. 3 illustrates an exemplary octet stream (i.e., an incoming data stream) being operated upon by the recognition system of the present disclosure.

The exemplary octet steam includes, but is not limited to, a recognition data stream utilized during a data recognition operation. The octet stream is shown to include an ID field and a data field although various other fields are contemplated by the present disclosure such as a time stamp field and/or a sequence number field. The ID field and the data field include values that respectfully indicate the ID and the incoming data of the exemplary octet stream. The data field is further partitioned to illustratively indicate bytes B15, B14, . . . B0 of the incoming data having hexadecimal values of "DF", "34", "7F", "23", "10", "1A", "DE", "3A", "7C", "23", "10", "50", "EF", and "BA", respectively. Although the exemplary octet stream is depicted as having 16 bytes of data, it is anticipated that the octet stream may vary in size and the present disclosure is not limited to this exemplary embodiment.

The processing module 40 initiates a data recognition operation when the processing module 40 detects a beacon or probe response including an octet stream. As previously mentioned, the processing module 40 can process various types of data structures associated with an octet stream. In the present example depicted in FIG. 3, the exemplary octet stream includes an ID value of "2" denoting a particular type of data structure such as a beacon or probe request. Although the ID is illustrated as a base-10 value, the present disclosure anticipates that IDs will be transmitted via a binary or hexadecimal format. The present disclosure contemplates a plurality of IDs that each represents a distinct type of data structure associated with various octet streams detected by the client station 12.

In the present example, the processing module 40 detects the ID (e.g., "2") of the octet stream and retrieves mask values of "0", "1", "1", "0", "0", "1", "1", "0", "0", "1", "1", "0", "0", "0", "0", and "1" that are associated with bytes B15, B14, . . . B0, respectively, of the octet stream. The retrieved mask bit values are based on the ID and are retrieved from a mask value table (not shown) stored in the processing module 40. The processing module 40 proceeds to mask, or filter, each byte of the data field of the octet stream with a corresponding mask value. In the present implementation, the mask values include a bit value of "1" or "0". If a particular mask value equals "1", the processing module 40 passes, or outputs, the corresponding data byte to the recognition data stream. However, if a particular mask value equals "0", the processing module 40 removes, or filters, the corresponding data byte and the remaining octet stream (i.e., the recognition data stream) does not include the corresponding data byte. In the present implementation, the set of mask values are predetermined and may be modified by a user/operator of the wireless network 10.

In the current example, the recognition data stream output by the processing module 40 includes the hexadecimal values of "34", "7F", "1A", "DE", "23", "10", and "FF" at bytes B14, B13, B10, B9, B6, B5, and B0, respectively, of the recognition data stream. The processing module 40 masks the hexadecimal values of "DF", "23", "10", "3A", "7C", "50", "EF", "BA", and "02" at bytes B15, B12, B11, B8, B7, B4, B3, B2, and B1, respectively. As a result, the recognition data stream is shown to include various "*"s at bytes B bytes B15, B12, B11, B8, B7, B4, B3, B2, and B1 that respectively denote inconsequential bytes (i.e., "don't care" bytes) that are not utilized in the data recognition operation.

The processing module 40 then generates a second hash value (i.e., a current hash value) based on the recognition data recovered from the current octet stream. As mentioned previously, the storage module 42 retains a stored hash value generated during a previous iteration of the data recognition operation, referred to as either a previous hash value or first hash value, for each respective type of data structure processed by the processing module 40 prior to receiving the exemplary octet stream. The storage module 42 stores each of first hash values based on their respective IDs. Each hash value represents a distinct parameter unique to a set of recognition data transmitted within a specific type of data structure. In other words, a variance among the first and the second hash values for a specific type of data structure represent a variance in recognition data received by the client station 12 at two different points in time.

In the current example, if the second hash value generated based on the hexadecimal values "34", "7F", "1A", "DE", "23", "10", and "FF" (i.e., the recognition data) does not equal the first hash value stored in the storage module 42, the processing module 40 proceeds to further process the exemplary octet stream. For example, the processing module 40 may detect a change in content and/or the amount of information elements (IEs) present within a beacon. However, if the second hash value equals the first hash value, the processing module 40 discards the exemplary octet stream. In other words, if the processing module 40 determines that the first and second hash values are not equal, the processing module 40 concludes that the beacon or probe response received by the client station 12 has changed from the beacon or probe response previously received by the client 12 received at a prior point in time.

By implementing the data recognition system of the present disclosure, the processing module 40 can verify or establish an association with a current access point or a different access point, respectively, within the wireless network 10 based on a portion, or subset, of data (i.e., the recognition data), thereby reducing the amount of memory and/or processing resources used within the client station 12 during a data recognition operation.

Figure 4:
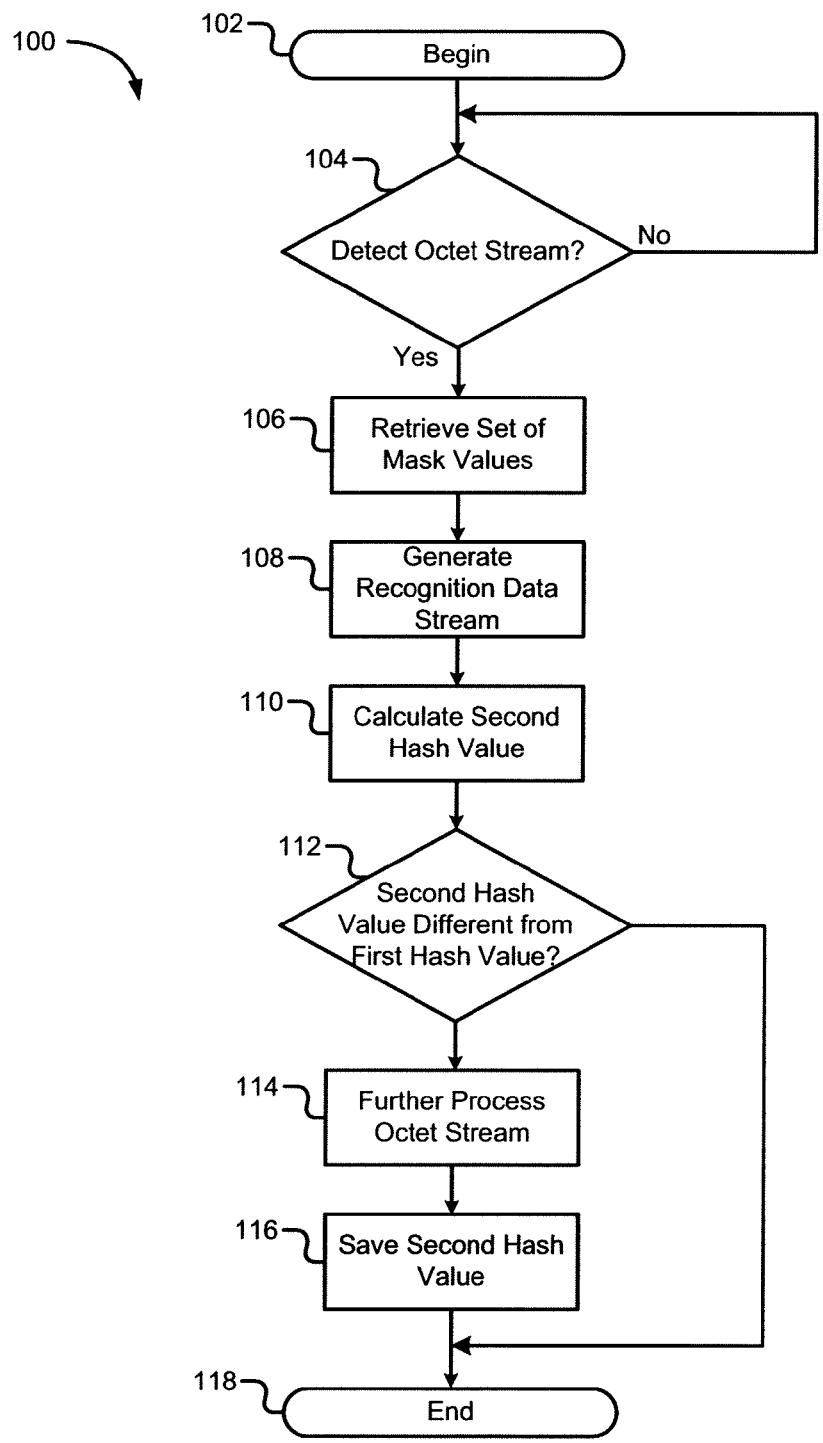
FIG. 4 is a flow diagram illustrating steps of operating the exemplary recognition system according to the present disclosure.
Figure 5B:
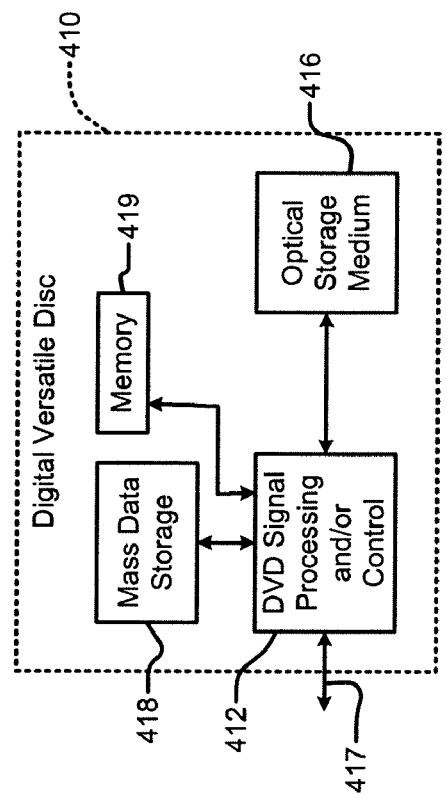
FIG. 5($a$) is a functional block diagram of a hard disk drive.
Figure 5A:
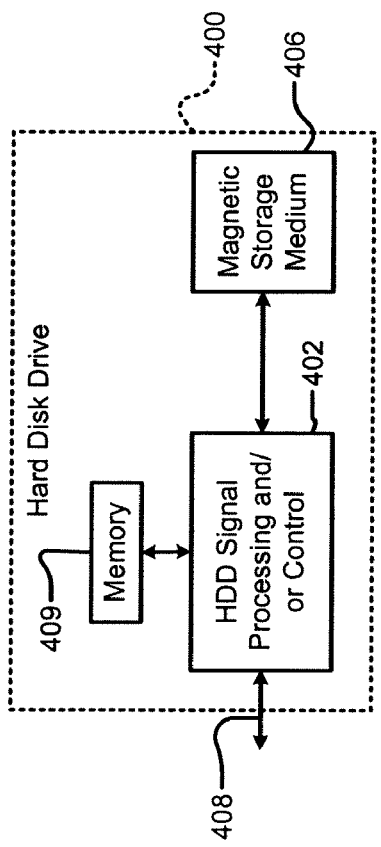
Figure 5D:
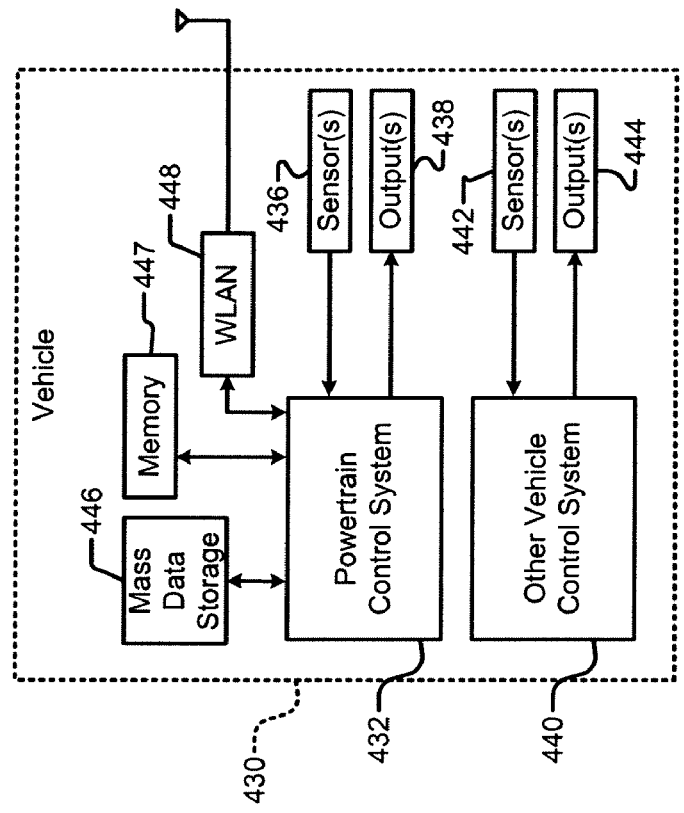
Figure 5C:
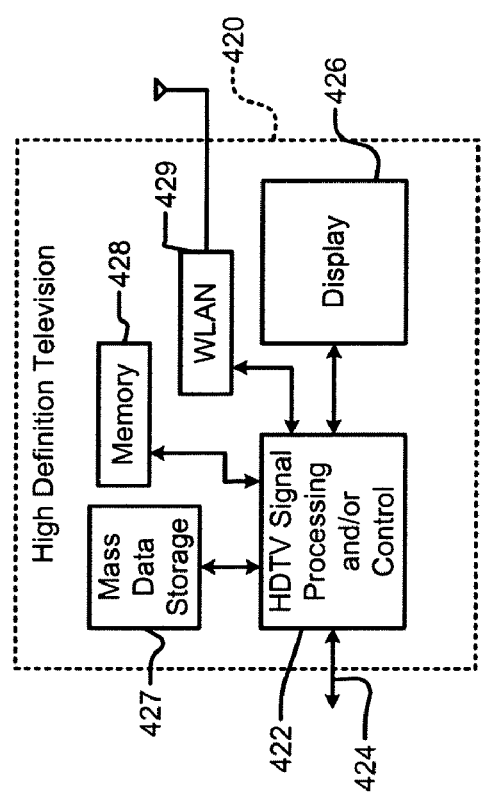
Figure 5E:
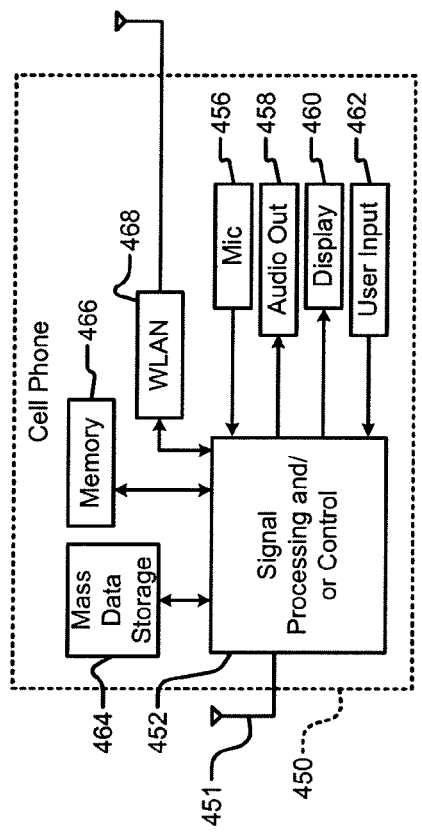
Figure 5F:
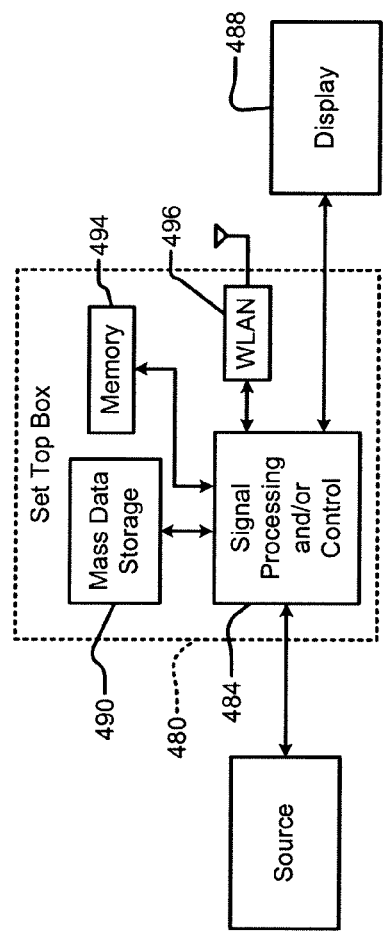
Figure 5G:
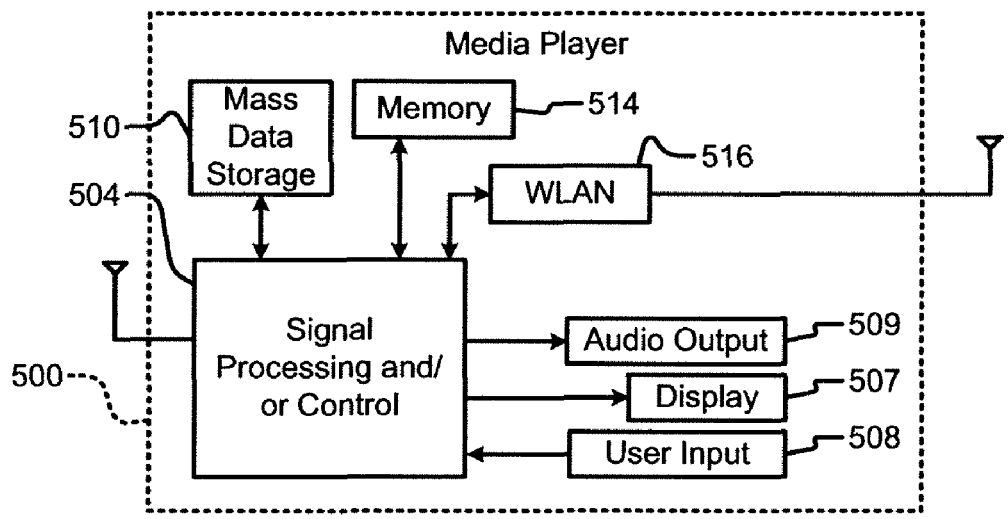
Figure 5H:
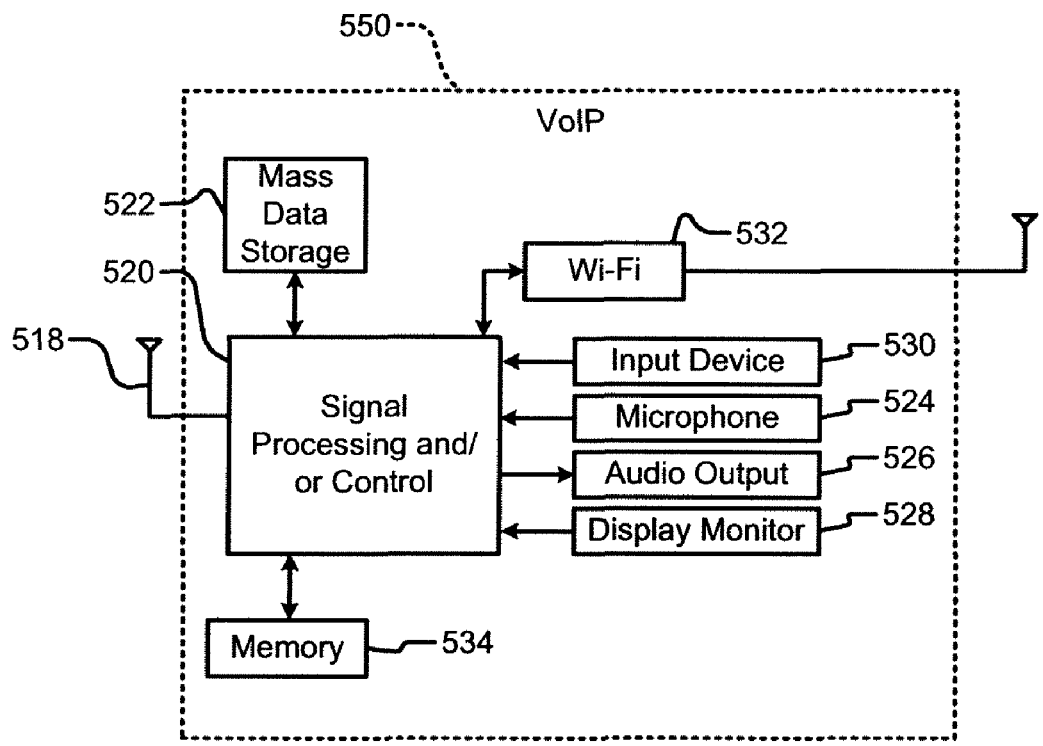

Referring to FIG. 4, a method 100 of performing a data recognition operation is shown in more detail. The method 100 begins at step 102. In step 104, the processing module 40 determines whether an octet stream has been detected. If the processing module 40 has not detected an octet stream, the method 100 returns to step 104. If the processing module 40 does detect an octet stream, the method proceeds to step 106.

In step 106, the processing module 40 retrieves a set of mask values from the mask value table based on an ID associated with the received octet stream. In step 108, the processing module 40 generates the recognition data stream when the processing module 40 applies the set of mask values to the received octet stream. In step 110, the processing module 40 calculates a second hash value based on recognition data within the recognition data stream.

In step 112, the processing module 40 determines whether the second hash value (i.e., the current hash value) equals a first hash value (i.e., a previous hash value) stored in the processing module 40. If the second hash value equals the first hash value, the processing module 40 proceeds to step 118. If the second hash value does not equal the first hash value, the processing module 40 proceeds to step 114. In step 114, the processing module 40 further processes the received octet stream. In step 116, the processing module 40 sets the first hash value equal to the second hash value. In other words, the processing module 40 replaces the first hash value with the second hash value. In step 118, the method 100 ends.

Referring now to FIGS. 5(*a*) to 5(*h*), various exemplary implementations of the present invention are shown. Referring to FIG. 5(*a*), the present invention may be embodied in a hard disk drive (HDD) 400. HDD 400 may communicate with a host device (not shown) such as a computer, mobile computing devices such as personal digital assistants, cellular phones, media or MP3 players and the like, and/or other devices via one or more wired or wireless communication links 408.

The present invention may be implemented with either or both signal processing and/or control circuits, which are generally identified in FIG. 5(*a*) at 402. In some implementations, the signal processing and/or control circuit 402 and/or other circuits (not shown) in the HDD 400 may process data, perform coding and/or encryption, perform calculations, and/or format data that is output to and/or received from a magnetic storage medium 406. HDD 400 may be connected to memory 409, such as random access memory (RAM), a low latency nonvolatile memory such as flash memory, read only memory (ROM) and/or other suitable electronic data storage.

Referring now to FIG. 5(*b*), the present invention may be implemented in a digital versatile disc (DVD) drive 410. The present invention may be implemented in either or both signal processing and/or control circuits, which are generally identified in FIG. 5(*b*) at 412, and/or mass data storage 418 of DVD drive 410. Signal processing and/or control circuit 412 and/or other circuits (not shown) in DVD drive 410 may process data, perform coding and/or encryption, perform calculations, and/or format data that is read from and/or data written to an optical storage medium 416. In some implementations, signal processing and/or control circuit 412 and/or other circuits (not shown) in DVD drive 410 can also perform other functions such as encoding and/or decoding and/or any other signal processing functions associated with a DVD drive.

DVD drive 410 may communicate with a device (not shown) such as a computer, television or other device via one or more wired or wireless communication links 417. DVD drive 410 may communicate with mass data storage 418 that stores data in a nonvolatile manner. Mass data storage 418 may include a HDD such as that shown in FIG. 5(*a*). The HDD may be a mini HDD that includes one or more platters having a diameter that is smaller than approximately 1.8". DVD drive 410 may be connected to memory 419, such as RAM, ROM, low latency nonvolatile memory such as flash memory, and/or other suitable electronic data storage.

Referring now to FIG. 5(*c*) the present invention may be embodied in a high definition television (HDTV) 420. The present invention may be implemented in either or both signal processing and/or control circuits, which are generally identified in FIG. 5(*c*) at 422, a WLAN interface 429 and/or mass data storage 427 of the HDTV 420. HDTV 420 may receive HDTV input signals in either a wired or wireless format via one or more wired or wireless communication links 424 and generate HDTV output signals for a display 426. In some implementations, signal processing circuit and/or control circuit 422 and/or other circuits (not shown) of HDTV 420 may process data, perform coding and/or encryption, perform calculations, format data and/or perform any other type of HDTV processing that may be required.

HDTV 420 may communicate with mass data storage 427 that stores data in a nonvolatile manner such as optical and/or magnetic storage devices. At least one HDD may have the configuration shown in either FIG. 5(*a*) and/or at least one DVD may have the configuration shown in FIG. 5(*b*). The HDD may be a mini HDD that includes one or more platters having a diameter that is smaller than approximately 1.8". HDTV 420 may be connected to memory 428 such as RAM, ROM, low latency nonvolatile memory such as flash memory and/or other suitable electronic data storage. HDTV 420 also may support connections with a WLAN via a WLAN network interface 429.

Referring now to FIG. 5(*d*), the present invention may be implemented in a control system of a vehicle 430, a WLAN interface 448 and/or mass data storage 446 of the vehicle control system. In some implementations, the present invention is implemented in a power-train control system 432 that receives inputs from one or more sensors 436 such as temperature sensors, pressure sensors, rotational sensors, airflow sensors and/or any other suitable sensors and/or that generates one or more output control signals such as engine operating parameters, transmission operating parameters, and/or other control signals at one or more output(s) 438.

The present invention may also be embodied in other control systems 440 of vehicle 430. Control system 440 may likewise receive signals from input sensors 442 and/or output control signals to one or more output(s) 444. In some implementations, control system 440 may be part of an anti-lock braking system (ABS), a navigation system, a telematics system, a vehicle telematics system, a lane departure system, an adaptive cruise control system, a vehicle entertainment system such as a stereo, DVD, compact disc and the like. Still other implementations are contemplated.

Powertrain control system 432 may communicate with mass data storage 446 that stores data in a nonvolatile manner. Mass data storage 446 may include optical and/or magnetic storage devices, for example HDDs and/or DVDs. At least one HDD may have the configuration shown in FIG. 5(*a*) and/or at least one DVD may have the configuration shown in FIG. 5(*b*). The HDD may be a mini HDD that includes one or more platters having a diameter that is smaller than approximately 1.8". Powertrain control system 432 may be connected to memory 447 such as RAM, ROM, low latency nonvolatile memory such as flash memory and/or other suitable electronic data storage. Powertrain control system 432 also may support connections with a WLAN via a WLAN network interface 448. The control system 440 may also include mass data storage, memory and/or a WLAN interface (all not shown).

Referring now to FIG. 5(*e*), the present invention may be embodied in a cellular phone 450 that may include a cellular antenna 451. The present invention may be implemented in either or both signal processing and/or control circuits, which are generally identified in FIG. 5(*e*) at 452, a WLAN interface and/or mass data storage of the cellular phone 450. In some implementations, cellular phone 450 includes a microphone 456, an audio output 458 such as a speaker and/or audio output jack, a display 460 and/or an input device 462 such as a keypad, pointing device, voice actuation and/or other input device. Signal processing and/or control circuits 452 and/or other circuits (not shown) in cellular phone 450 may process data, perform coding and/or encryption, perform calculations, format data and/or perform other cellular phone functions.

Cellular phone 450 may communicate with mass data storage 464 that stores data in a nonvolatile manner such as optical and/or magnetic storage devices, for example HDDs and/or DVDs. At least one HDD may have a configuration shown in FIG. 5(*a*) and/or at least one DVD may have the configuration shown in FIG. 5(*b*). The HDD may be a mini HDD that includes one or more platters having a diameter that is smaller than approximately 1.8". Cellular phone 450 may be connected to memory 466 such as RAM, ROM, low latency nonvolatile memory such as flash memory and/or other suitable electronic data storage. Cellular phone 450 also may support connections with a WLAN via a WLAN network interface 468.

Referring now to FIG. 5(*f*), the present invention may be embodied in a set top box 480. The present invention may be implemented in either or both signal processing and/or control circuits, which are generally identified in FIG. 5(*f*) at 484, a WLAN interface and/or mass data storage of the set top box 480. Set top box 480 receives signals from a source such as a broadband source and outputs standard and/or high definition audio/video signals suitable for a display 488 such as a television and/or monitor and/or other video and/or audio output devices. Signal processing and/or control circuits 484 and/or other circuits (not shown) of the set top box 480 may process data, perform coding and/or encryption, perform calculations, format data and/or perform any other set top box function.

Set top box 480 may communicate with mass data storage 490 that stores data in a nonvolatile manner. Mass data storage 490 may include optical and/or magnetic storage devices, for example HDDs and/or DVDs. At least one HDD may have a configuration shown in FIG. 5(*a*) and/or at least one DVD may have the configuration shown in FIG. 5(*b*). The HDD may be a mini HDD that includes one or more platters having a diameter that is smaller than approximately 1.8". Set top box 480 may be connected to memory 494 such as RAM, ROM, low latency nonvolatile memory such as flash memory and/or other suitable electronic data storage. Set top box 480 also may support connections with a WLAN via a WLAN network interface 496.

Referring now to FIG. 5(*g*), the present invention may be embodied in a media player 500. The present invention may be implemented in either or both signal processing and/or control circuits, which are generally identified in FIG. 5(*g*) at 504, a WLAN interface and/or mass data storage of the media player 500. In some implementations, media player 500 includes a display 507 and/or a user input 508 such as a keypad, touchpad and the like. In some implementations, media player 500 may employ a graphical user interface (GUI) that typically employs menus, drop down menus, icons and/or a point-and-click interface via display 507 and/or user input 508. Media player 500 further includes an audio output 509 such as a speaker and/or audio output jack. Signal processing and/or control circuits 504 and/or other circuits (not shown) of media player 500 may process data, perform coding and/or encryption, perform calculations, format data and/or perform any other media player function.

Media player 500 may communicate with mass data storage 510 that stores data such as compressed audio and/or video content in a nonvolatile manner. In some implementations, the compressed audio files include files that are compliant with MP3 format or other suitable compressed audio and/or video formats. The mass data storage 510 may include optical and/or magnetic storage devices, for example HDDs and/or DVDs. At least one HDD may have a configuration shown in FIG. 5(*a*) and/or at least one DVD may have the configuration shown in FIG. 5(*b*). The HDD may be a mini HDD that includes one or more platters having a diameter that is smaller than approximately 1.8".

Media player 500 may be connected to memory 514 such as RAM, ROM, low latency nonvolatile memory such as flash memory and/or other suitable electronic data storage. Media player 500 also may support connections with a WLAN via a WLAN network interface 516. Still other implementations in addition to those described above are contemplated.

Referring to FIG. 5(*h*), the present invention may be embodied in a Voice over Internet Protocol (VoIP) phone 550 that may include an antenna 518. The present invention may be implemented in either or both signal processing and/or control circuits, which are generally identified in FIG. 5(*h*) at 520, a wireless interface and/or mass data storage of the VoIP phone 550. In some implementations, VoIP phone 550 includes, in part, a microphone 524, an audio output 526 such as a speaker and/or audio output jack, a display monitor 528, an input device 530 such as a keypad, pointing device, voice actuation and/or other input devices, and a Wi-Fi communication module 532. Signal processing and/or control circuits 520 and/or other circuits (not shown) in VoIP phone 550 may process data, perform coding and/or encryption, perform calculations, format data and/or perform other VoIP phone functions.

VoIP phone 550 may communicate with mass data storage 522 that stores data in a nonvolatile manner such as optical and/or magnetic storage devices, for example HDDs and/or DVDs. At least one HDD may have a configuration shown in FIG. 5(*a*) and/or at least one DVD may have the configuration shown in FIG. 5(*b*). The HDD may be a mini HDD that includes one or more platters having a diameter that is smaller than approximately 1.8". VoIP phone 550 may be connected to memory 534, which may be a RAM, ROM, low latency nonvolatile memory such as flash memory and/or other suitable electronic data storage. VoIP phone 550 is configured to establish communications link with a VoIP network (not shown) via Wi-Fi communication module 532.

All of the discussion above, regardless of the particular implementation being described, is exemplary in nature, rather than limiting. Although specific components of the recognition system are described, methods, systems, and articles of manufacture consistent with the recognition system may include additional or different components. For example, components of the recognition system may be implemented by one or more of: control logic, hardware, a microprocessor, microcontroller, application specific integrated circuit (ASIC), discrete logic, or a combination of circuits and/or logic. Further, although selected aspects, features, or components of the implementations are depicted as hardware or software, all or part of the systems and methods consistent with the recognition system may be stored on, distributed across, or read from machine-readable media, for example, secondary storage devices such as hard disks, floppy disks, and CD-ROMs; a signal received from a network; or other forms of ROM or RAM either currently known or later developed. Any act or combination of acts may be stored as instructions in computer readable storage medium. Memories may be DRAM, SRAM, Flash or any other type of memory. Programs may be parts of a single program, separate programs, or distributed across several memories and processors.

The processing capability of the system may be distributed among multiple system components, such as among multiple processors and memories, optionally including multiple distributed processing systems. Parameters, databases, and other data structures may be separately stored and managed, may be incorporated into a single memory or database, may be logically and physically organized in many different ways, and may implemented in many ways, including data structures such as linked lists, hash tables, or implicit storage mechanisms. Programs and rule sets may be parts of a single program or rule set, separate programs or rule sets, or distributed across several memories and processors.

It is intended that the foregoing detailed description be understood as an illustration of selected forms that the invention can take and not as a definition of the invention. It is only the following claims, including all equivalents, that are intended to define the scope of this invention.

What is claimed is:

1. A first wireless device configured for data recognition, the first wireless device comprising:
   a processor that is configured to:
      generate a first hash value based on a first incoming data stream received by the first wireless device from a second wireless device;
      generate a second hash value based on a second incoming data stream received by the first wireless device from the second wireless device; and
      detect a change in recognition data used to at least one of identify, select, or recognize the second wireless device based on a comparison of the first hash value with the second hash value; and
   a storage memory in communication with the processor and configured to store the first hash value.

2. The first wireless device of claim 1 wherein the processor is further configured to identify an identification parameter (ID) of the second incoming data stream and retrieve one of a plurality of sets of mask values based on the ID.

3. The first wireless device of claim 2 wherein the processor is further configured to generate a recognition data stream when the processor masks the second incoming data stream with the one of the plurality of sets of mask values.

4. The first wireless device of claim 3 wherein the processor is configured to generate the second hash value based on the recognition data stream and retrieve the first hash value from the memory based on the ID.

5. The first wireless device of claim 1 wherein the processor is further configured to discard the second incoming data stream when the first hash value and the second hash value are equal.

6. The first wireless device of claim 1 wherein the processor is further configured to set the first hash value to the second hash value when the first hash value does not equal the second hash value, and retain the second incoming data stream for further processing by the wireless device.

7. The first wireless device of claim 1, wherein the processor is further configured to:
   determine whether to switch the first wireless device from association with the second wireless device to association with a third wireless device, the determination being based on the detected change in the recognition data associated with the second wireless device.

8. A first wireless device configured for data recognition, the first wireless device comprising:
   means for generating a first hash value based on a first incoming data stream received by first the wireless device from a second wireless device;
   means for generating a second hash value based on a second incoming data stream received by the first wireless device from the second wireless device; and
   means for detecting a change in recognition data used to at least one of identify, select, or recognize the second wireless device based on a comparison of the first hash value with the second hash value; and
   means for storing the first hash value.

9. A method for processing recognition data for a first wireless device, the method comprising:
   generating a first hash value based on a first incoming data stream received by the first wireless device from a second wireless device;
   storing the first hash value;
   generating a second hash value based on a second incoming data stream received by the first wireless device from the second wireless device; and
   comparing the first hash value with the second hash value to determine a change in recognition data used to at least one of identify, select, or recognize the second wireless device.

10. The method of claim 9 further comprising identifying an identification parameter (ID) of the second incoming data stream and retrieving one of a plurality of sets of mask values based on the ID.

11. The method of claim 10 further comprising generating a recognition data stream based on masking the second incoming data stream with the one of the plurality of sets of mask values.

12. The method of claim 11 further comprising generating the second hash value based on the recognition data stream and retrieving the first hash value from the memory based on the ID.

13. The method of claim 9 further comprising discarding the second incoming data stream when the first hash value and the second hash value are equal.

14. The method of claim 9 further comprising setting the first hash value to the second hash value when the first hash value does not equal the second hash value and retaining the second incoming data stream for further processing by the wireless device.

15. A non-transitory computer-readable storage medium storing a computer program comprising instructions for causing a processor to:
   generate a first hash value based on a first incoming data received from a wireless device;
   store the first hash value; and
   generate a second hash value based on a second incoming data stream received from the wireless device; and
   detect a change in recognition data used to at least one of identify, select, or recognize the wireless device based on a comparison between the first hash value with the second hash value.

16. The non-transitory computer-readable storage medium of claim 15 wherein the computer program further comprises instructions for causing the processor to identify an identification parameter (ID) of the second incoming data stream and retrieving one of a plurality of sets of mask values based on the ID.

17. The non-transitory computer-readable storage medium of claim 16 wherein the computer program further comprises instructions for causing the processor to generate a recognition data stream based on masking the second incoming data stream with the one of the plurality of sets of mask values.

18. The non-transitory computer-readable storage medium of claim 17 wherein the computer program further comprises instructions for causing the processor to generate the second hash value based on the recognition data stream and retrieving the first hash value from the memory based on the ID.

19. The non-transitory computer-readable storage medium of claim 15 wherein the computer program further comprises instructions for causing the processor to discard the second incoming data stream when the first hash value and the second hash value are equal.

20. The non-transitory computer-readable storage medium of claim 15 wherein the computer program further comprises instructions for causing the processor to set the first hash value to the second hash value when the first hash value does not equal the second hash value and retaining the second incoming data stream for further processing by the wireless device.

\* \* \* \* \*